(No Model.)

T. H. BROWN.
TWO WHEELED VEHICLE.

No. 286,174. Patented Oct. 9, 1883.

Witnesses:

Inventor:
Thomas H. Brown
By Jas. B. Erwin
Attorney.

United States Patent Office.

THOMAS H. BROWN, OF MILWAUKEE, WISCONSIN.

TWO-WHEELED VEHICLE.

SPECIFICATION forming part of Letters Patent No. 286,174, dated October 9, 1883.

Application filed November 20, 1882. Renewed July 16, 1883. (No model.)

*To all whom it may concern:*

Be it known that I, THOMAS H. BROWN, a citizen of the United States, residing at Milwaukee, in the county of Milwaukee and State of Wisconsin, have invented certain new and useful Improvements in Two-Wheeled Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in carts or two-wheeled vehicles, and pertains, first, to the device for adjusting the body of the vehicle to conform to the various inclinations of the thills when attached to horses of different heights; second, to the manner of attaching the body of the vehicle to the axle, and the peculiar relative arrangement of the parts shown.

Figure 1:
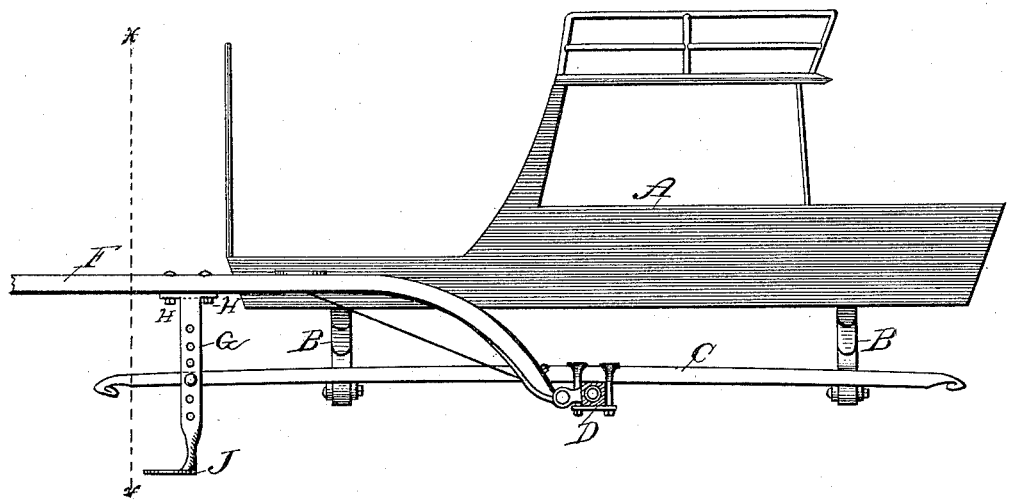
Figure 2:
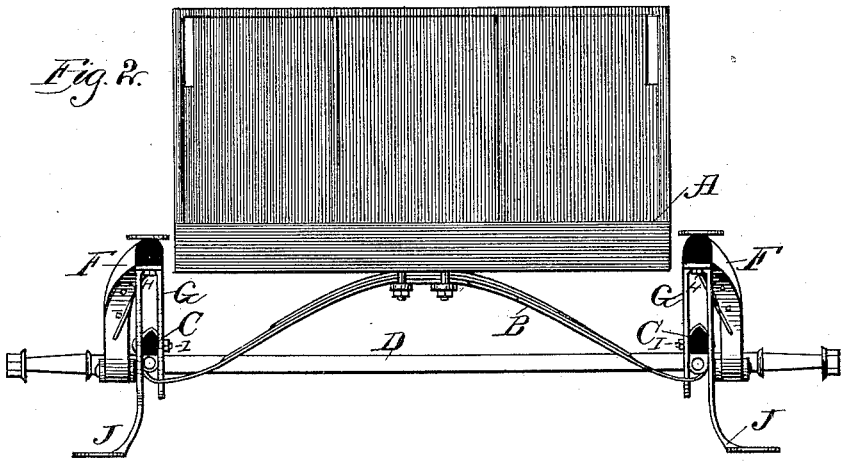

My invention is further explained by reference to the accompanying drawings, in which Figure 1 represents a side view, and Fig. 2 an end view.

Like parts are represented by the same reference-letters in both views.

A is the body of the carriage. B B are the springs. C C are the side bars. D is the axle. F F are thills. G G are the adjusting-standards. The body A is supported upon the springs B B. The springs B B are attached at their respective ends to the respective side bars, C. The bars C are rigidly attached directly to the axle D.

Heretofore it has been common in two-wheeled vehicles to attach the thills rigidly to the axle, whereby the axle is prevented from turning with the body of the carriage. By my improvement the thills are attached to the axle by ordinary thill-couplings, which permit the front end of said thills to be adjusted higher or lower relatively to said axle and the body of the carriage, whereby the body of the carriage may be retained in a true horizontal position, while the front end of the thills may be raised or lowered to conform to the height of any horse to which the carriage may be attached. The thills are retained at the desired angle to the body of the carriage by the adjusting-standards G. Said standards are permanently attached to the thills by bolts H, and detachably connected to the side bars, C, by bolts I. When desired to raise or lower the front ends of the thills, the bolts I are withdrawn, and the thills are raised or lowered to the required position, when the bolts I are again inserted through such holes in said standards as are brought in line with said side bars, and thus secured by a nut in the ordinary manner, whereby the thills and body of the carriage are rigidly retained, as mentioned, at any desired angle to each other.

J J are steps formed on the lower ends of the adjusting-standard G. Said standard being attached to both the thills and side bars, it is obvious that the weight of a person upon said steps is sustained equally by both of said supports, thus relieving the thills from the strain to which they are ordinarily subjected.

Having thus described my invention, what I claim as new, and desire to secure by Letters Patent, is—

1. The combination, with the thills F and side bars, C, of the adjusting-standards G, said standards being adapted to retain the thills at any desired point of adjustment or angle to the body, as set forth.

2. The combination, in a two-wheeled vehicle, of the side bars, C, and axle D, as attached directly to each other, springs B B, and body A, as set forth.

3. The combination, in a two-wheeled vehicle, of axle D, side bars, C, standards G, thills F, and flexible coupling, said coupling being adapted to permit of the inclination of the thills to conform to the several points of adjustment of said standards, as set forth.

4. The combination of standard G, thills F, side bars, C, and step J, the thills and side bars being adapted by such connection with the standard to jointly sustain the weight brought upon the step, as set forth.

In testimony whereof I affix my signature in presence of two witnesses.

THOMAS H. BROWN.

Witnesses:
JAS. B. ERWIN,
WM. J. SINNOTT.